Feb. 15, 1927.  
C. L. HUSTON  
1,617,486  
FACING SHEARS FOR CUTTING HEAVY SHEET METAL  
Filed July 24, 1922  6 Sheets-Sheet 1

Fig.1.

INVENTOR.  
Charles L. Huston.  
BY  
ATTORNEY.

Feb. 15, 1927.
C. L. HUSTON
1,617,486
FACING SHEARS FOR CUTTING HEAVY SHEET METAL
Filed July 24, 1922    6 Sheets-Sheet 3

INVENTOR
Charles L. Huston.
BY
ATTORNEY

Patented Feb. 15, 1927.

1,617,486

UNITED STATES PATENT OFFICE.

CHARLES L. HUSTON, OF COATESVILLE, PENNSYLVANIA.

FACING SHEARS FOR CUTTING HEAVY SHEET METAL.

Application filed July 24, 1922. Serial No. 576,998.

My invention relates to hydraulic shears for cutting heavy plates.

My main purpose is to arrange the adjustment, alignment and simultaneous action throughout of two shears facing each other, for cutting heavy metal, for doing rapid work in cutting varying widths of material on one or both sides, for securing progressively continuous action of the shears for varying lengths of material, thereby obtaining accuracy in width greater than can be obtained by the usual hand methods of moving the plates up to a single shear and the necessary turning thereby involved.

Also, to free the successive settings, movements of material and cutting operations from interference because of the scrap from previous cuts.

Also, to provide auxiliary movements and devices so as to carry out the successive cuts and operations necessary to the desired object in a mechanical, practical manner for rapid production of heavy metal plates, by complete mechanical means, without the necessity of any manual labor and avoiding the necessity for turning the plates around, as is usually done for shearing successively the different sides of the plate, and to avoid repeated adjustment and clamping of the plate to prevent it from shifting or creeping from its position during the process of shearing, which would otherwise produce inaccurate work.

My device obviates the necessity of doing this troublesome and tedious work, and secures the production of rapid, parallel, straight, accurately sheared product, with a practical elimination of all manual labor, and is adapted to work in with the modern methods of rapid production of successive, continuous processes from the heating furnaces, through the rolling mill, cooling, inspection, laying out, shearing, weighing, etc., ready for shipment of the finished material.

A further essential feature in the operation of these shears is to provide lateral release for the sliding, cutting heads and other knives, so that they will not crowd against the cut sides of the plates, and will not press the plate against the other knife during the lifting motion, or during the return to their starting position, and thus avoid lifting the plate or dragging down the cutting blades and the troubles consequent upon this action.

Further purposes will appear in the specification and in the claims.

I have preferred to illustrate my invention but by one general form among the various forms to which the invention is applicable, selecting a form which is highly practical, effective and reliable and which at the same time well illustrates the principles of my invention.

Fig. 10ª corresponds to Fig. 10 but shows a second form.

I have discovered that it is highly desirable to cut both sides of heavy sheet metal coincidently rather than separately and have invented devices by which the difficulties inherent to such simultaneous cutting are overcome.

Exactness in the setting of the oppositely facing shears used, in order to secure parallelism of the cutting lines of the two shears is highly desirable. Any deviation from this requires corresponding additional allowance for trimming and prevents successive cuts from matching the preceding cuts in width and position.

In the operation of hydraulic shears, the work operated upon is heavy sheet metal which is desirably carried to and from the shears by power-driven rolls. The shears themselves weigh a great many tons and exert tremendous pressures upon the work. Naturally, there is considerable tendency to spring the upper shear knives laterally, (rearwardly) away from their duty and from the lower shear knives, during the downward stroke, with corresponding excessive side pressure of these upper knives on their upward strokes against the work and displacement of the sheet which has just been cut. The engagement of the upper knives against the lower knives on the upward strokes also tends to tear the upper knives loose from the beams. It is also quite desirable to relieve the lower knives from engagement with the work while the work is being moved to begin a new cut upon the same sheet or upon a new sheet and to keep the scrap from pushing against the lower knives which would prevent moving the plate to its right position.

I space the shears by right and left hand screws at opposite sides of the shears, turning together in pairs of spaced nuts, one pair at each end of each of the shears. The nuts are axially adjusted in order that fine adjustment may be made by their equal movement at opposite ends of the same shear and that alignment may be secured and errors in alignment may be corrected by adjustment of any pair of nuts at one end only of a shear.

The upper (movable) beams are shifted forward, each toward the opposite shear, for the cutting strokes and allowed to fall rearwardly away from the other shear for the return strokes in order that the movable knives may not bind against the fixed knives nor against the work on the upward strokes. This shifting is effected by wedge guide mechanism operated from the cylinder by which the intensifier valves are opened and closed to operate the shears, and the wedge operation is timed with respect to the intensifier valve movement so that the wedge movement may be completed before the shears begin their strokes. The work is lifted automatically to free it from contact with the lower knives, this also being effected by the mechanism by which the intensifier valves are opened and closed because of the desirability of timing it with respect to them and completing the lifting before the upward strokes begin.

Because these several mechanisms are so desirably coupled with the operating mechanism for the intensifier valves, in the description of my mechanism I will start with the application of the air to the control cylinder for the intensifier, and will subsequently describe the more detailed construction of one of the shears and of the several mechanisms by which my purposes are secured.

The two shears illustrated are opposite counterparts, duplicates except for the placing of the beams and shear knives, which are reversed, right and left hand, one as compared with the other, and so placed that the corresponding ends of the shear knives face each other, that is, the lower end of one knife is directly opposite the lower end of the other. The shears are placed in parallel positions, facing each other for the purpose of simultaneous operation upon opposite sides or ends of the same material to be sheared, whereby short sections may be sheared completely and simultaneously, or long sheets of metal may be trimmed along both sides in successive sections operated upon simultaneously.

The connections and mechanism by which the operations of the two shears are synchronized, either by hydraulic means or by mixed hydraulic and mechanical means, though described herein, are intended to be claimed in a co-pending application filed by me.

The shears 11 and 11' rest upon base plates 12, 12' which are guided in bed plates 13, 13'. Each shear comprises a lower beam 14, knife 15 and housings 16, supported by the base plate, upper connecting yoke 17, upper (movable) beam 18 carrying knife 19, operating mechanism for the movable beam, guides therefor, and pullback mechanism and connections for the movable beam.

The intensifier.

The operating mechanism for the upper beam comprises a steam intensifier of any type, shown here as inverted and having steam cylinder 21, having inlet 22, and exhaust 23. The hydraulic cylinders, 24, 25, 26, 27 are arranged in diametrical pairs and are connected, one pair by special fitting 28 and pipes 29, 29' with the main operating cylinders 30 and 31, and the other pair by special fitting 32 and pipes 33, 33' with the main operating cylinders 35 and 36, at the same time synchronizing the two shears. The steam piston is connected by rods 37 with a crosshead 38 from which plungers 39 extend into the cylinders 24, 25, 26 and 27.

The intensifier rests upon a frame 40. It is protected against piston over-running by a rod 41 (Figure 3) extending into the path of piston travel, to rock a lever 42 pivoted at 43 in a bracket 44 and spring-retracted at 45. The opposite end of lever 42 is connected with a rod 46 which pushes downwardly upon a bell crank 47 pivoted at 48 in the lower end of one of the arms of a bell crank 49, pivoted at 50.

Downward movement of rod 46 and the consequent clockwise turning of bell crank 47, moves link 51 to the left and turns bell crank 52 pivoted at 53, in a counter-clockwise direction. This lowers link 54 connecting the other arm of the same bell crank with weighted valve stem 55 of steam inlet valve 56, closing the steam inlet.

The intensifier valves are controlled through a hand-lever 58 controlling the valve member of a four-way control valve 59, having exhaust at 61 and connections at 62 and 63 to the front and rear ends, respectively, of an operating cylinder 64.

The piston rod 65 of this cylinder connects through cross-head 66 with a valve-operating rod 67 carrying adjustable collars 68 and 69. These collars engage the arms 70 and 71 of bell cranks 72 and 73, pivoted at 74 and 74' and counter-weighted at 75 and 75'. The other arms 76 and 77 of these bell cranks are connected to rods 57 and 78.

The connections of the rod 57 have already been explained. The upper end of rod 78 is connected to a lever 79, pivoted at 80 and the opposite end of this lever is linked at 81 to the weighted valve stem 82 of the exhaust valve 83.

The valve operation.

When air is admitted to cylinder 64 to move rod 67 to the left, the lost motion provided allows time for lowering work-holding rollers and guide wedges, hereinafter described, before collar 68 engages arm 70. The collar then rocks the bell crank, pulling the rod 57 downwardly. This rocks the bell crank 49, swinging the bell crank 47 bodily to the right about the pivot of rod 46 in lever 42 as a center. This throws the link 51 to the right and turns the bell crank 52 in clockwise direction, lifting the weighted valve stem 55 and opening the inlet valve, which closes as soon as the pressure upon the arm 70 is released.

When reversed, air admission to cylinder 64 moves the rod 67 to the right, lost motion allows time for the lifting of the rollers and wedges, before the collar 69 engages arm 71 to rock the bell crank 73 in counter-clockwise direction. This pulls down the rod 78, turning the lever 79 and lifting the weighted valve stem 82 of the exhaust valve to open the exhaust valve and to hold it open until the pressure upon arm 71 is released.

I synchronize the two cylinders of the shear and at the same time connect their plungers 86, 87, 86', 87' to the movable beam through links 88 each connected at the other end to one of the lever arms 89 integral with and forming part of rock shaft 90. The shafts turn in bearings 91. The opposite ends of the levers 89 are connected by links 92 with the upper movable beam 18 carrying the upper shear knife. Connection is also made between the shaft and the beam by arms 93 and additional links 92'.

The two shears are synchronized hydraulically by the use of separate hydraulic cylinders for each from the same intensifier and the strains upon the intensifier are balanced by coupling diametrically opposite cylinders.

The upper beams are retracted by pull-back systems comprising, for each shear, a pair of pull-back cylinders 94, plungers 95, beam 96 and a rod 97 connecting this beam to the movable beam.

Air or liquid supply to the pull-back through constant pressure from an accumulator or through valve control are both well known and either can be used. Without going into detail in regard to this, I show a supply of fluid at 98, branched to the two cylinders through pipes 98'.

The coarse and fine adjustment for the shear spacing.

The adjustment of the shears toward and from each other upon bed plates 13, 13' is effected by right and left screws 99 and 99' extending transversely to the cutting planes of the shears, one at each end thereof. They offer a coarse adjustment, and the capability of moving the cooperating pairs of nuts 100 axially affords not only a fine adjustment by moving the nuts at both ends of one or both shears, but a means of securing correct alignment, by moving both the nuts upon the same end of the proper one of the screws. The use of a pair of nuts in each position affords a take-up for lost motion between the threads of the screws and the threads of the nuts by moving one of the nuts toward the other of the same pair.

The nuts comprise cast bases 101 adapted to move upon finished surfaces on the base plates 12 and caps 101' bolted to the bases. The nuts are bolted to the base plates after adjustment.

Figure 4:
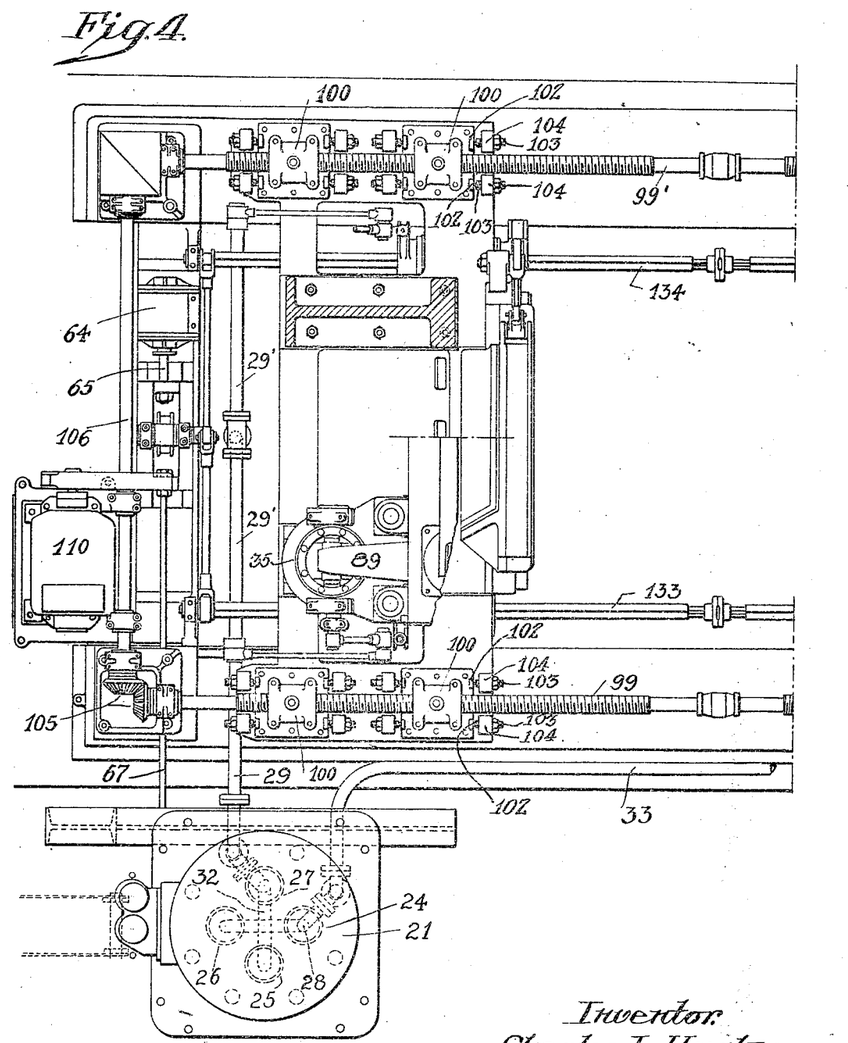
Fig. 4 is a top plan view, partly in section, of a shear and intensifier seen in Figs. 1, 2 and 3.
Figures 5, 6, 10A:
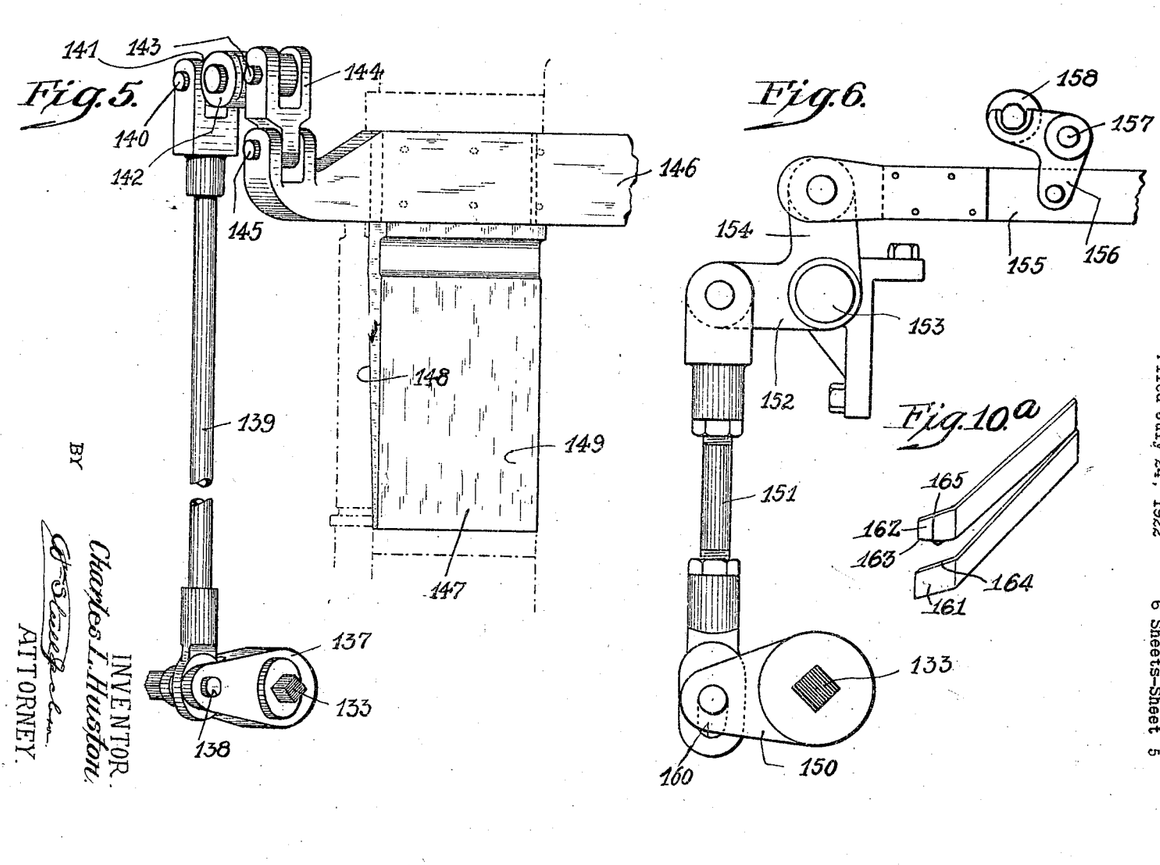
Fig. 5 is a broken detached perspective view showing the mechanism by which the upper shear knife is released for the upward stroke.
Fig. 6 is a partial horizontal section, chiefly in side elevation, showing, in detached position, the connections for lifting the plate from the lower shear knife.

The bases are flanged at 102 to provide convenient bearing for set screws 103, locked in flanges 104, carried by the base plates, as shown in Fig. 4, so that, by release of the screws at one end of a nut and tightening those at the other end, the nuts are moved bodily lengthwise of the screws 99, 99'.

The screws are driven by miter gears 105 upon a shaft 106 which carries also a gear 107 meshing with a pinion 108 upon the armature shaft 109 of a motor 110, so that the right and left screws may be turned equally in the proper direction to draw both shears toward each other or to force them away from each other at will.

*The operation of the rocker shafts.*

The crosshead 66 connects the piston rod 65 and the valve-operating rod 67. It slides in a guide 111 formed between a channel 112 and pillow blocks 113, bolted thereto, so that the crosshead is supported in all directions except that of its travel. The bearings for which the pillow blocks provide are completed by caps 114, and support the integral shafts 115 of a rocker 116. The rocker carries off-set rollers 117 and 118 supported in the opposite corners of triangular webs 119 spaced along the rocker shaft to leave room for the rollers and apertured to receive the roller shafts 120.

Figure 7:
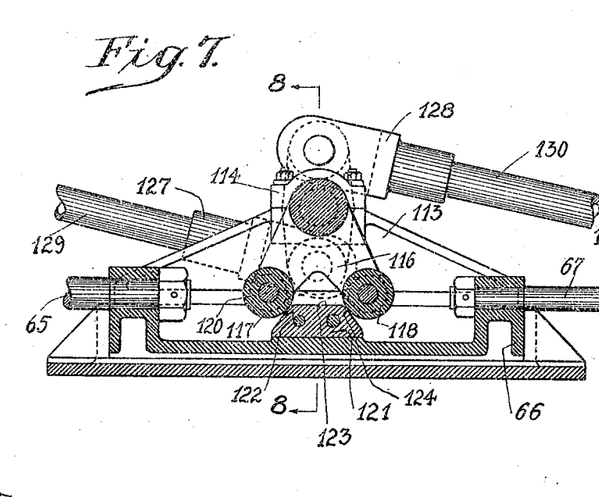
Fig. 7 is a section of Fig. 8 upon lines 7—7.
Figure 8:
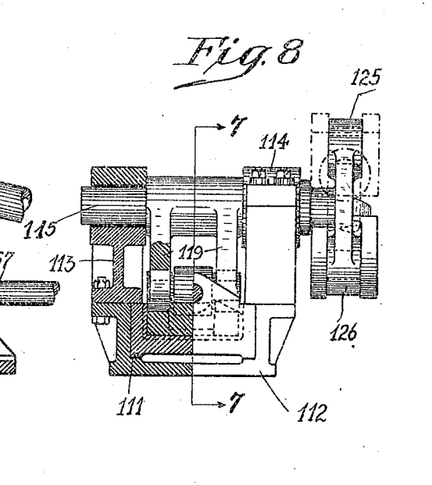
Fig. 8 is in half an elevation and the other half a section of Fig. 7, the section being taken upon line 8—8.

The rollers 117, 118 are shown in an intermediate position in Figure 7, where they straddle a block 121 rigid with the crosshead. With movement of the crosshead to the left, the end 122 of the block engages roller 117, swings it, and thus the rocker, in a clockwise direction, and lifts the roller so that it rides upon the surface 123 of the block 121, where it rests at the end of the crosshead stroke. At the same time the other roller 118 rides further down upon the opposite end 124 of the block. With movement of the block to the right, the end 124 of the block engages with roller 118 and turns the rocker in a counter-clockwise direction as soon as the roller 118 is free from the surface 123, the roller 118 finally mounting the surface 123 and coming to rest upon this surface at the other extremity of the crosshead stroke.

One of the shafts 115 is extended beyond the pillow-block to carry opposite crank arms 125 and 126, to which are connected the forked terminals 127 and 128 of connecting rods 129 and 130. These connecting rods extend to and are pivotally connected with lever arms 131 and 132 upon non-circular (here square) shafts 133 and 134.

The shafts are located at opposite ends of the shears, one on each side, and pass beneath both shears. They are supported at their ends in brackets 135 and at any suitable intermediate points by flanged bushings 136 fitting the shafts upon the inside of the bushings and having bearing in the shears.

*Front and back movement of the upper beam.*

Each of the square shafts 133 and 134 carries two lever arms 137, one for each shear, slidable along the shaft but fitting its contour so to be turned by it. Each of the lever arms is connected at 138 with a rod 139 connected at its other end at 140 to one of the terminals 141 of a pivoted lever 142, the opposite end of which is connected at 143 to a link 144. All of these connections are pivoted.

The two lever arms and connections for each shear are similarly located upon opposite sides of the shear so that the two links 144 are pivoted at opposite ends at 145 to a wedge beam 146 carrying identical wedges 147 for engagement upon the rear faces 148 with the housings, and whose front faces 149 act as guides for and forwardly displace the upper (movable) beam. Since the wedges engage with the housings throughout their entire operative lengths they offer complete guiding support for the beam, free from chattering.

When the wedges are forced downwardly the forward displacement of the beam brings the upper knife out to the shearing plane to perform its shearing function; but when the wedges are withdrawn, the movable beam is allowed to fall back by gravity, or spring or is mechanically pressed back where this is desired, so as to withdraw the upper knife rearwardly from the shearing plane to any extent which may have been determined. This relieves the upper knife from engagement with the lower knife and with the work on the upward stroke, preventing the rubbing of the knives together or binding of the knife against the work and displacement of the work.

The wedges for both shears are operated by the same mechanism and their action is made simultaneous. The wedge operation may be timed to their place at any part of the stroke desired, provided the knives come forward prior to engagement with the metal to be cut and recede after the cut is completed and before rubbing of the knives or knife and work take place. It is very desirable to operate them at the start of the stroke of the piston in cylinder 64 and before the valves are operated, thus lifting the wedges just before the upward stroke is begun and seating the wedges just before the downward stroke begins.

*The lifting of the work.*

I use one of the square shafts to operate means to lift the work to free it from the lower knife for re-setting or movement with respect to the knife. At any convenient point, preferably at the front of each shear, I mount lever arms 150 upon the shaft, to slide along it with adjustment of shear spacing, but to turn with the shaft. These levers 150 are connected by rods 151 with one arm each of bell cranks 152 pivoted at 153. The other arms, 154 of the bell cranks, are connected by a strap 155 with one arm each of series of bell cranks 156 pivoted at points 157 located at intervals along the length of the lower knives and preferably within the lower beams so that rollers 158 carried by these bell cranks can pass through openings 159 in the lower beam to drop below the surface of the beam when the work is set or is being acted upon and to pass through these openings to lift and carry the weight of the work when it is desired to move the work. All of the connections are pivoted and lost motion is provided at any suitable place in the connections, as at 160, so that the release of the wedges may precede the lifting of the rollers.

*The scrap cutting knives.*

In order to cut off the scrap, I provide supplemental knives 161 and 162 connected to cut continuously with the main knives and located at the toes of the upper and lower knives. The upper auxiliary knives may slope away from the lower at the point of juncture at the same rate (i. e., have the same rake) as in the case of the main knives and I show them as having the same initial slope or rake at 163. However, I increase the slope at the outer parts of these knives, beginning at some such point as at 164 in order to reduce the speed of cutting and ease off the final cutting engagement with the metal.

In order to avoid having the juncture between the main knives and these auxiliary scrap-cutting knives occur at the corner where these scrap-cutting knives diverge from the direction of the main knives, I may form the corners as parts of the scrap-cutting knives and join them to the main knives at 164 and 165, near but preferably not at the ends of the straight portions of the main cuts or, better, the joint may be made in the scrap-cutting portion of the combination to avoid scratching the plate by the joint.

Figures 3, 9, 10:
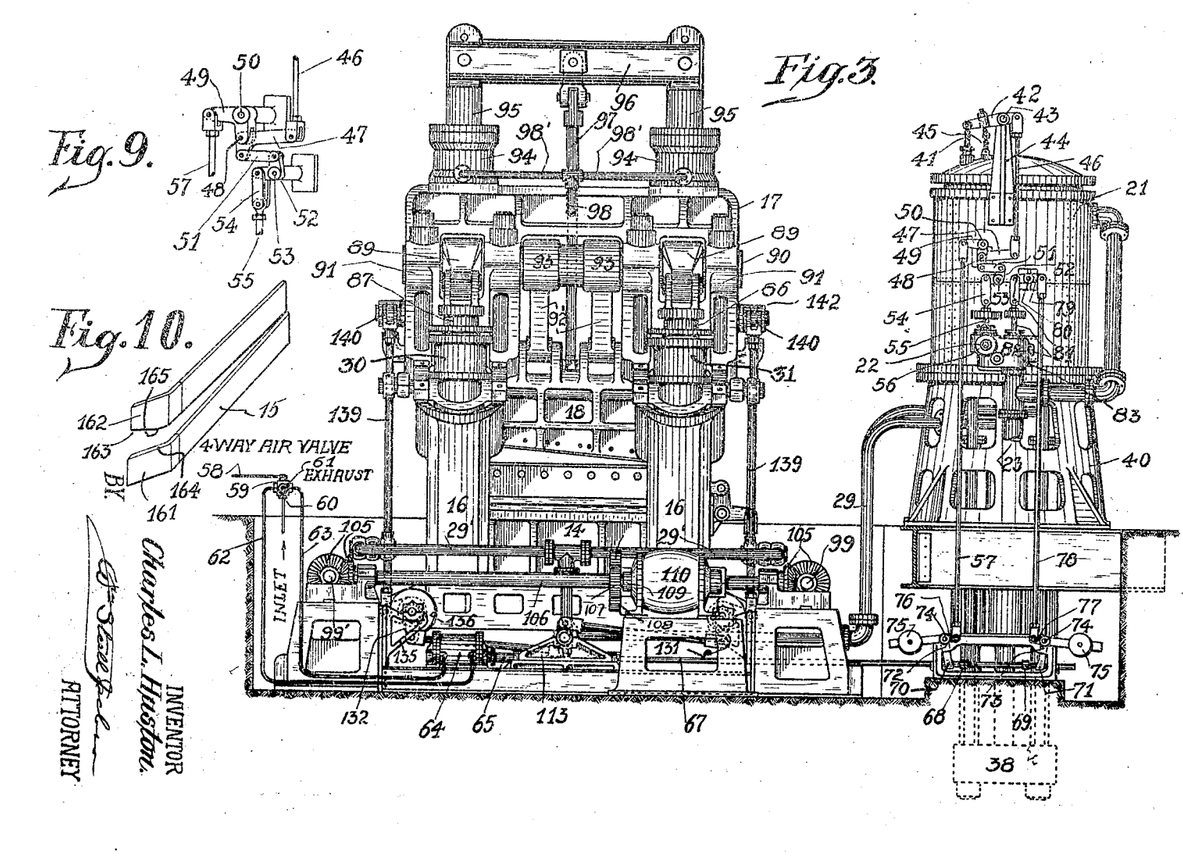
Fig. 3 is a rear view of one of the shears and of the intensifier seen in Fig. 1.
Fig. 9 is a perspective view of part of the valve-operating connections for the intensifier.
Fig. 10 is an enlarged perspective view showing the scrap-cutting knives in their relation to each other and to the main knives.

In Figure 10ª the scrap-cutting knives are integral with the main knives.

The auxiliary scrap-cutting knives form obtuse angles with the main knives, the exact angle formed not being of paramount importance; but being greater than 90° in order to permit clearance when released by withdrawal of the wedges.

It will be evident that concurrent cutting by the main knives on opposite sides of the plate results in support by each knife against the lateral component of pressure due to cutting by the other knife; and that to a greater degree—because the lateral pressure is much greater—the lateral cutting by each of the concurrently operating scrap-cutting knives supports against lateral movement due to the cutting of the other.

*In operation.*

The shears are adjusted by the motor and screws 99 and 99′ and this adjustment may be made to yield any degree of fineness desired by the use of a fine pitch for the threads of these screws. Any finer adjustment required or any correction of alignment may be made by adjustment of the nuts through which these screws pass.

Figure 1:
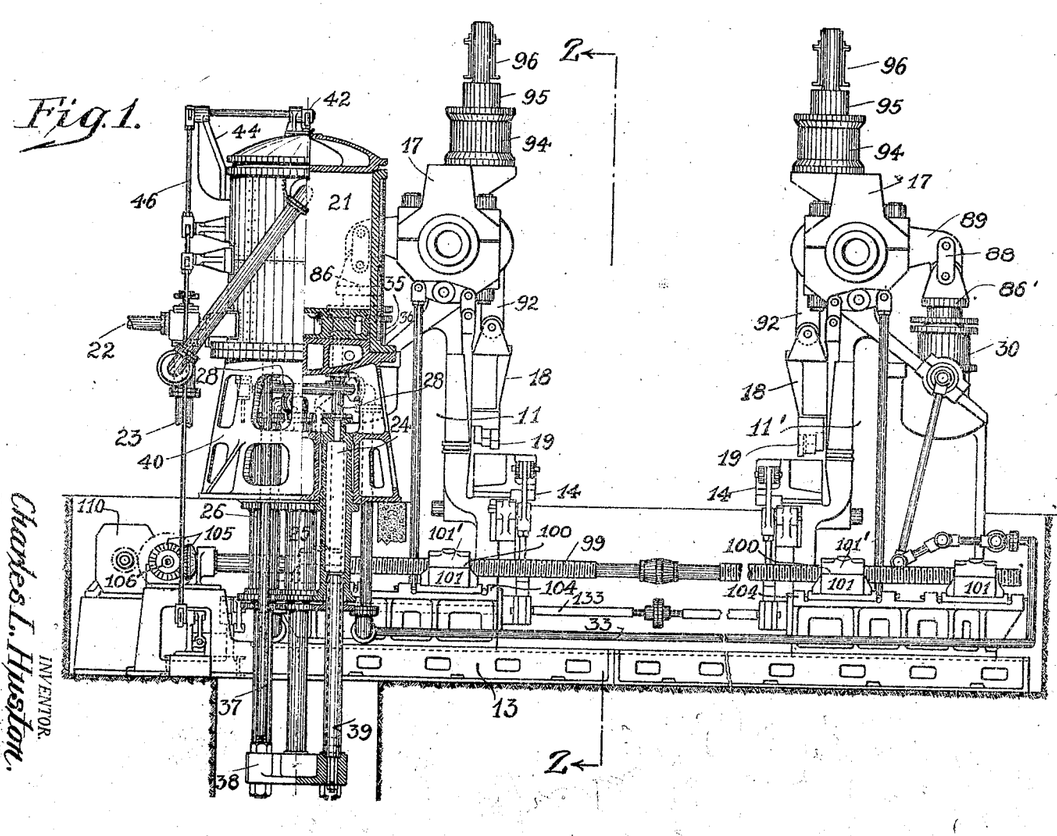
Figure 1 is a side elevation of an intensifier, partly in section, and of a pair of shears operated from it.
Figure 2:
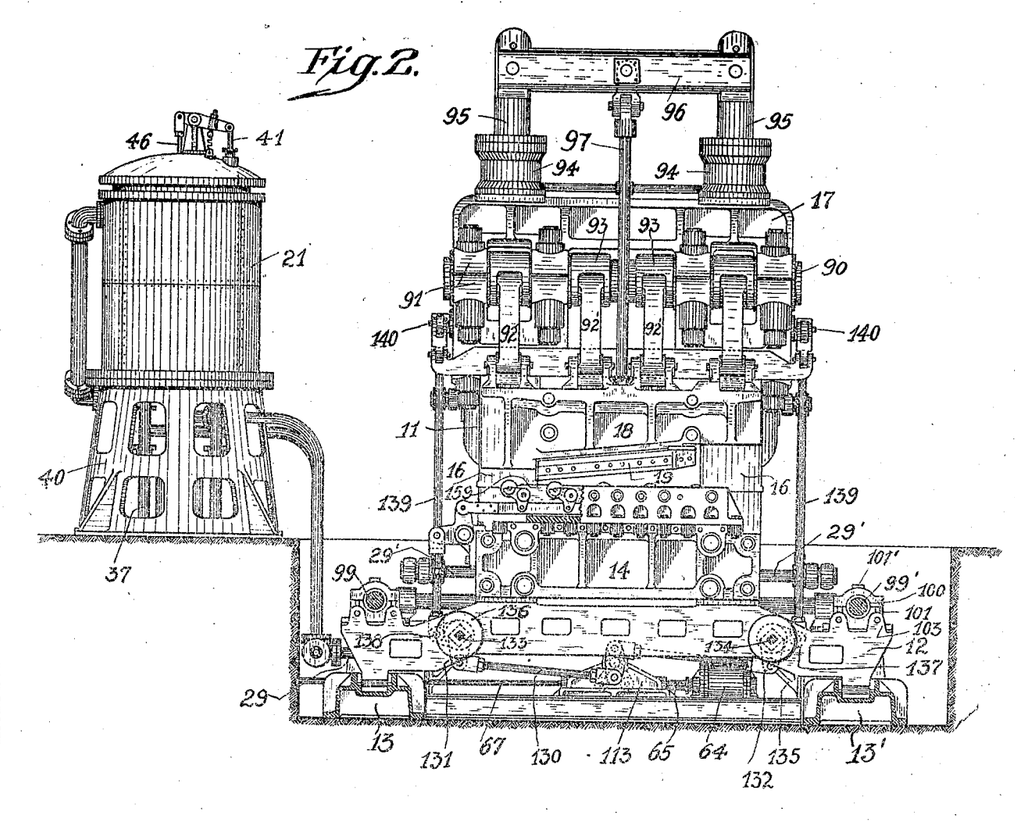
Fig. 2 is a section taken upon line 2—2 of Fig. 1 looking in the direction of the arrows.

With the parts in the position shown in front elevation in Figure 2 and in rear elevation in Figure 3 the 4-way valve is opened in the proper direction to admit steam to the intensifier. In the subsequent operation it must be remembered that both shears operate alike and coincidently, to shift the beams, lower the work, cut, release the beams, lift the work and raise the knives.

With the first movement of the cross-head the shafts 133 and 134 are rocked to lower the plate-supporting rollers and to force the wedges downwardly, shifting the upper beams forwardly (toward each other) until their knives lie in the cutting planes. Continued movement of the cross-head, moving rod 67 opens the steam intensifier inlet valve and causes the upper beams and knives to make their strokes and complete the cuts.

At the end of the strokes the 4-way valve is reversed in position to move the cross-head in the reverse direction. As soon as this movement begins the rocking shafts are turned to lift the wedges, permitting the upper beams and knives to fall away rearwardly (away from each other), releasing the engagement of the upper knives and releasing the knives from the work. The rollers are then lifted to raise the work from the lower knives ready for a new setting to begin a new cut where the scrap-cutting knives had removed the scrap at the preceding cut. With further movement of the cross-head the inlet of the intensifier is closed, the exhaust is opened and the accumulator pressure upon the plungers of the pull-back forces the water out of the main shear cylinders, returning the parts to the position shown in Figure 2.

The operation of the scrap cutting knives is very simple as they merely cut out to the edge of the sheet from the end of the straight portion being cut, freeing from the difficulty of attempting to feed the plate with its scrap attached or of separately cutting off the scrap and from the binding action of the scrap against the side of the lower knife which with the two shears arranged in double opposed position as described will clear the way for the forward movement of the work to set it for the succeeding cut.

I recognize that the adjustments and work lifting features as well as mechanism by which they are carried out are of advantage in individual shear construction and also in other types of hydraulic machinery, in which other tools are equivalents, for this purpose of the shear.

It will be obvious that the benefits of my invention may be obtained in whole or in part by quite different physical embodiments of them, differing according to the skill and resource of the designer or the special needs or appliances that he has in mind for which the tools are intended, and it is my purpose therefore to cover in my claims all such different forms and changes as come within the fair spirit and scope of my invention.

Having thus described my invention, what I claim as new and desire to secure by Letters Patent is:

1. The method of operating shears intended to cut opposite sides of heavy metal which consists in guiding the movable knives within planes for the shearing function and moving the guides to secure movement of the knives away from the shearing planes and from each other for the upward stroke.

2. The method of operating shears intended to cut opposite sides of heavy metal which consists in providing guides against which the movable beams for the upper knives rest and whereby they are guided in the shearing planes for their cutting strokes and moving the guides rearwardly away from each other to allow the knives to fall away from said planes for the upward strokes.

3. The method of shearing sheet metal by knives of which one is fixed and the other movable in a plane, and freeing the knife from contact with the work on reverse movement, which consists in altering the plane of travel of the knife to cut on the downward stroke in a constant shear plane and to move away rearwardly from the work and from the plane of the other knife for the upward stroke.

4. The method of shearing by knives along the work which consists in shearing along the work, cutting off the scrap as part of the same stroke at the end of each cut, but starting with the longer dimensions of the cut, and cutting progressively, the scraps being cut last, re-setting the material to begin a new cut at the point where the scrap was cut off and repeating the shearing operation.

5. The method of shearing by knives along opposite sides of the same work, which consists in concurrently shearing on the two sides of the work, cutting off the scrap as part of the same stroke at the end of each cut and steadying the work for each cutting of the scrap on one side by the cutting of the scrap on the other, re-setting the material to begin a new cut at the point where the scrap was cut off and repeating the shearing operation.

6. The method of shearing by knives along opposite sides of the same work, which consists in cutting concurrently upon opposite sides thereof and cutting off the scrap as a part of the same cutting stroke, withdrawing the shearing knives from the cutting plane for the upward stroke, re-setting the work to begin a new cut at the point where the scrap was cut off, moving the knives back into the cutting plane and repeating the cutting operation.

7. The method of relieving the fixed shear knife of a shear from rubbing action by the work during re-setting of the work which consists in automatically lifting the work in close proximity to the knife during the operation of the shear after one cutting operation and prior to the idle stroke of the knife.

8. The method of preventing rubbing of shear knives upon the upward stroke of the shear and of the work against the bottom knife in a shear having a constant shear plane which consists in moving the upper knife out of the shearing plane for its upward stroke while maintaining the lower knife in fixed position and subsequently lifting the work free from the lower knife before moving the work.

9. The method of adjustment of two shears having major and minor adjusting mechanisms which consists in making the major adjustment concurrently at both ends of both shears and making minor adjustments and alignments by adjustment of the connections between the major adjusting mechanism and the shears.

10. In hydraulic shears for cutting heavy metal, an intensifier, a pair of shears having cutting knives and hydraulic cylinders and connections moving one of the knives of each shear, control mechanism including a cylinder and connections for operating the intensifier valves, rocker shafts and connections operated by said control mechanism, and lever and wedge connections between the rocker shafts and the movable shear knives to shift the shear knives forwardly toward each other for the cutting stroke and rearwardly for the upward stroke.

11. In hydraulic shears for cutting heavy metal, an intensifier, a pair of shears having cutting knives and hydraulic cylinders and connections moving one of the knives of each shear, control mechanism, including a cylinder and connections for operating the intensifier valves, rocker shafts and connections operated by said control mechanism and lever and wedge connections between the rocker shafts and the movable shear knives to shift the shear knives forwardly toward each other for the cutting stroke and rearwardly for the upward stroke, there being lost motion in the valve connections whereby the shifting takes place before the valves are operated.

12. In shears intended for cutting heavy metal, an intensifier having a steam cylinder and hydraulic cylinders, valves for the steam cylinder, a pair of shears having housings, main operating cylinders, an upper movable and a lower fixed beam for each shear and knives therefor, operating mechanism for the steam cylinder valves having lost motion, rocking shafts rocked by said operating mechanism during the time represented by such motion, arms thereon, beam-shifting guides connected with said arms to shift the movable beams forwardly, toward each other for the downward stroke and to release for the upward stroke and work-lifting mechanism timed to act subsequently to the release and connections from the rocking shafts for operating the same.

13. In a pair of shears for cutting heavy metal, a pair of rocking levers movable in planes parallel with the cutting plane, control mechanism for moving said levers, housings on opposite sides of each of the shears, movable beams carrying a movable knife on each said beam, fixed beams and knives, operating mechanism for lifting and lowering the movable beams, wedges resting against the housings and acting as guides for the movable beams and connections between the levers and the wedges to set the wedges and force the upper beams forwardly to bring their knives into the cutting plane for the downward stroke and to release them therefrom for the upward stroke.

14. In a pair of shears intended for cutting heavy metal, an intensifier having a steam cylinder and hydraulic cylinders, valves for the steam cylinder, a pair of shears having housings, main operating cylinders, upper movable beams, lower fixed beams and knives for the beams, operating mechanism for the steam cylinder valves having lost motion, rocking arms rocked by said operating mechanism during the time represented by such lost motion, and beam-shifting guides connected with the rocking arms to move the upper beams forwardly toward each other for the downward stroke and release them therefrom for the upward stroke.

15. In a pair of shears intended for cutting heavy metal, an intensifier having a steam cylinder and hydraulic cylinders, valves for the steam cylinder, a pair of shears having housings, main operating cylinders, upper movable beams, lower fixed beams and knives for the beams, operating mechanism for the steam cylinder valves having lost motion, rocking arms rocked by said operating mechanism during the time represented by such lost motion, and work-lifting mechanism connected with said rocking arms to lift the work with one direction of operating mechanism movement and to lower the work upon the fixed knife with the opposite direction of movement.

16. In a pair of shears intended for cutting heavy metal, an intensifier having a steam cylinder and hydraulic cylinders, valves for the steam cylinder, a pair of shears having housings, main operating cylinders, upper movable beams, lower fixed beams and knives for the beams, operating mechanism for the steam cylinder valves having lost motion, rocking arms rocked by said operating mechanism during the time represented by such lost motion, and wedges bearing against the housings on one side of each and acting as guides for the movable beams on the opposite sides thereof, connected with said rocking arms to set the wedges during lost motion movement of the valve operating mechanism in one direction and to withdraw the wedges during lost motion movement of said mechanism in the opposite direction.

17. In a pair of shears for heavy metal, fixed lower beams and knives, upper movable beams and knives, operating mechanism therefor, housings for the upper beams, movable guides for positioning the upper knives and connections for moving the guides so that the upper knives will cut on their downward strokes and will retire from the work and lower knives laterally with respect to the cutting plane preparatory to the upward strokes.

18. In a pair of shears for heavy metal, lower fixed beams and knives, upper movable beams and knives, operating mechanism therefor, housings for the upper beams, and automatic connections for moving the upper beams and knives so that their planes of movement advance forwardly toward each other for the downward stroke and recede for the upward stroke.

19. In a pair of shears for heavy metal, lower fixed beams and knives, upper movable beams and knives, operating mechanism therefor, housings for the upper beams, and automatic means for moving the upper beams and knives bodily toward each other to cut in one position and relieving from contact with the lower knives and work in the other position.

20. In a pair of shears for heavy metal, lower fixed beams and knives, upper movable beams and knives, operating means for the movable beams, housings along which the beams travel and guides supported laterally by said housings and movable to vary the projection of the beams with respect to said housings to cut on the downward stroke and relieve from engagement of the cutting knives on the upward stroke.

21. In a pair of shears for heavy metal, lower fixed beams and knives, upper movable beams and knives, operating mechanism for the movable beams, a control for the operating mechanism, housings along which, as guides, the upper beams are adapted to travel, guides for the upper beams and automatic means set in motion by the control for projecting the cutting surfaces of the upper knife toward each other to different extents with respect to the housings.

22. In shears for heavy metal, lower fixed

.beams and knives, upper movable beams and knives, housings for the upper beams, guides having guiding surfaces supported by said housings, operating mechanism and control for the movement of the beams, and means for projecting the guiding surfaces of the guides forwardly and rearwardly of the housings, timed with respect to the movement of the beams, to cause cutting engagement with the knives on the downward strokes and lateral release thereof on the upward strokes.

23. In shears for heavy metal, lower fixed beams and knives, upper movable beams and knives, housings at the sides of the shear, operating mechanism for the beams and longitudinally movable guides for the beams supported at the back by the housings, guiding the beams and projecting them toward each other to different extents in the different positions.

24. A shear adapted to cut heavy metal and having an upper movable knife and a lower fixed knife, in combination with control and operating mechanism for said shear having lost motion at the beginning and end of the stroke, a work support for lifting the work from the lower shear knife and connections between the mechanism and the work support automatically lifting the work support at the beginning of the upward stroke and lowering the work-lifting mechanism at the beginning of the downward stroke.

25. Shears adapted to cut heavy metal and having upper movable knives and lower fixed knives, in combination with control and operating mechanism for said shears having lost motion at the beginning and end of the strokes, work supports for lifting the work from the lower shear knives and connections between the mechanism and the work supports automatically lifting the work supports at the beginning of the upward strokes and lowering the work-lifting mechanism preparatory to the beginning of the downward strokes.

26. In a shear intended for cutting heavy metal, an intensifier having a steam cylinder and hydraulic cylinders, valves for the steam cylinder, a shear having housings, main operating cylinders, an upper movable beam, a lower fixed beam and knives for the beams, operating mechanism for the steam cylinder valves having lost motion, a rocking arm rocked by said operating mechanism during the time represented by such lost motion, and work-lifting mechanism connected with said rocking arm to lift the work with one direction of operating mechanism movement and to lower the work upon the fixed knife with the opposite direction of movement.

27. In work supporting mechanism, a shear having upper and lower knives, a set of rollers adjacent to the lower knife, control and operating mechanism for the shear, providing lost motion in the mechanism at both ends of the shear stroke, a shaft rocked by the mechanism in opposite directions at the two ends of the stroke and lever connections between said shaft and said rollers timed to lift them between the cutting strokes and to lower them as preparatory to the downward stroke, and during the lost motion.

28. In work supporting mechanism, a shear, having upper and lower knives, a set of rollers adjacent to the lower knife of the shear, control and operating mechanism for the shear, a shaft rocked thereby and lever connections between the shaft and rollers whereby rocking of the shaft raises and lowers said rollers to free the work from or rest it upon the lower knife.

29. In work supporting mechanism, a shear having upper and lower knives, a set of rollers adjacent to the lower knife of the shear, control and operating mechanism for the shear, a shaft rocked thereby, a lever on said shaft, bell cranks carrying said rollers and connections between the lever and bell cranks to lift or lower the rollers with rocking of the shaft.

30. A pair of facing shears operating upon opposite sides of the same sheet of metal, in combination with a set of rollers adjacent to the lower knife of each shear, control and operating mechanism for the shear and connections lifting the rollers relatively timed with movements of the movable shear knives to lift the work between the operating strokes of the two shears.

31. A pair of facing heavy-metal shears each having upper and lower knives, one of which is movable, control and operating mechanism for the shears to move them together, work supporting rollers in sets, one set adjacent each shear and lifting mechanism for the rollers synchronized to lift them together, connected with said control and operating mechanism and movable between the effective strokes of the shears.

32. A pair of heavy metal shears having upper movable knives and lower fixed knives and connected to operate synchronously upon the same work, in combination with common adjusting means for bringing the shears toward or moving them away from each other and separate fine adjusting means for more exactly spacing the shears.

33. In a pair of shears having upper movable knives and lower fixed knives and connected for coincident operation upon the same work, common adjusting means for the shears, operating at both ends of both shears to move them toward and from each other, in combination with separate fine adjustments for the shears to alter their positions with respect to the common adjusting mechanism, located one at each end of each shear.

34. In a pair of shears having upper movable knives and lower fixed knives and connected for coincident operation upon the same work, common adjusting means for the shears operating at both ends of both shears to move them toward and from each other, in combination with separate fine adjustments for the shears to alter their positions with respect to the common adjusting mechanism, located one at each end of each shear and separately movable to secure alignment of the shears.

35. In a pair of shears having upper movable knives and lower fixed knives and connected for coincident operation upon the same work, common adjusting means for the shears operating at both ends of both shears to move them toward and from each other, in combination with aligning devices between the adjusting mechanism and the shears.

36. In a pair of shears having upper movable knives and lower fixed knives and connected for coincident operation upon the same work, common adjusting means for the shears, operating at both ends of both shears to move them toward and from each other, in combination with take-up mechanisms for lost motion in the adjusting means.

37. A pair of shears having upper movable knives and lower fixed knives and connected to operate upon the same work, in combination with right- and left-threaded screws extending from shear to shear, one at each side, common turning mechanism for the screws, nuts engaging the screws and connected with the shears and axial adjustments for the nuts to align the shears or secure fine adjustment of the spacing between them.

38. A pair of shears having upper movable knives and lower fixed knives and connected to operate upon the same work, in combination with right- and left-threaded screws extending from shear to shear, one at each side, common turning mechanism for the screws, nuts engaging the screws, two at each side of each shear and axial adjustment for the nuts to take up lost motion between the nuts and the screws.

39. A pair of shears adapted to operate upon the same work, in combination with right- and left-threaded screws extending from shear to shear, one at each side, common turning mechanism for the screws, nuts engaging the screws, two at each side of each shear and axial adjustment for the nuts to take up lost motion between the nuts and the screws and to move both nuts for adjustment of the shear with respect to the screws.

40. In a shear for cutting heavy sheet metal, a pair of main shear knives, the upper one sloping from the toe thereof to form a continuous rake, in combination with a pair of auxiliary scrap cutting shear knives united to cut continuously with the main shear knives and having a different rake on the upper scrap cutting shear knife from that of the upper main shear knife.

41. In a shear for cutting heavy sheet metal, a pair of main shear knives, the upper of which has a uniform slope, in combination with a pair of auxiliary shear knives united to cut continuously therewith at the toes thereof, extending at an angle lateral to the main shear knives and the upper of which auxiliary knives terminates its cutting portion at a greater rake than the rake of the main shear knife.

42. In a shear for cutting heavy metal, a pair of main shear knives making the final cut, in combination with terminal auxiliary shear knives having greater terminal rake to each other than the main shear knives.

43. A pair of facing reciprocatory shears having cutting edges at whose toes the blades turn away from each other at an obtuse angle to cut off the scrap after the main cut has been completed.

44. In facing reciprocatory shears for cutting heavy metal, the combination of upper and lower straight shear knives of which the upper knives are movable and angularly extending scrap cutting knives connected with the toes of the straight fixed and movable knives but departing angularly to less than 90° from the plane of the straight knives and cutting after the straight knives have finished their cut.

45. In combination with facing reciprocatory shears for cutting heavy metal, upper and lower straight shear knives for each shear, of which the upper knives in each are movable and angularly extending scrap cutting knives connected with the toes of the straight fixed and movable knives, cutting subsequently to the straight knives and extending at obtuse angles with respect to the straight knives with which they are connected and in opposite directions so as to cut away from each other.

46. Two pairs of straight shear knives having the upper knife of each movable, scrap cutting extensions from the straight knives of each pair extending in opposite directions in the two pairs and cutting subsequent to the straight knives and means for reciprocating the knives concurrently.

47. Two pairs of oppositely facing shears having the upper knives in each shear movable in combination with means for reciprocating the knives concurrently and means for shifting the upper knives away from each other after each cut and in preparation for the upward stroke of the knives.

48. A pair of oppositely facing shears having fixed lower knives and movable upper knives in combination with means for reciprocating the upper knives concurrently and automatic means for lifting work common to the two shears at a predetermined time in the operation of the shears.

49. Two pairs of shears facing and having fixed lower knives and movable upper knives, lateral spacing devices for moving the upper knives away from each other for the upper stroke and lifting means synchronized with respect to the movement of the knives for lifting common work between cutting strokes.

CHARLES L. HUSTON.